(12) United States Patent
Buehler et al.

(10) Patent No.: US 12,455,061 B1
(45) Date of Patent: Oct. 28, 2025

(54) HEATED ILLUMINATION ASSEMBLY

(71) Applicant: EMERGENCY TECHNOLOGY, INC., Hudsonville, MI (US)

(72) Inventors: William S. Buehler, Hudsonville, MI (US); Patrick James Eiswerth, Grand Rapids, MI (US); Weston Harness, Hudsonville, MI (US); Heather M. Meerman, Conklin, MI (US); Douglas V. Baker, Hudsonville, MI (US)

(73) Assignee: Emergency Technology, Inc., Hudsonville, MI (US)

( * ) Notice: Subject to any disclaimer, the term of this patent is extended or adjusted under 35 U.S.C. 154(b) by 0 days.

(21) Appl. No.: 18/909,901

(22) Filed: Oct. 8, 2024

(51) Int. Cl.
  *F21S 45/60* (2018.01)
  *H05B 1/02* (2006.01)
  *H05B 3/86* (2006.01)

(52) U.S. Cl.
  CPC ............ *F21S 45/60* (2018.01); *H05B 1/0236* (2013.01); *H05B 3/86* (2013.01); *H05B 2203/037* (2013.01); *H05B 2214/02* (2013.01)

(58) Field of Classification Search
  CPC ...................................................... F21S 45/60
  See application file for complete search history.

(56) References Cited

U.S. PATENT DOCUMENTS

| | | | |
|---|---|---|---|
| 7,040,791 B2 | 5/2006 | Nakamura | |
| 8,068,961 B2 | 11/2011 | Menze | |
| 8,845,128 B2 | 9/2014 | Pickholz | |
| 10,017,104 B2 | 7/2018 | Jackson | |
| 10,364,954 B2 | 7/2019 | Deering | |
| 10,744,927 B2 | 8/2020 | Elgh | |
| 10,793,056 B2 | 10/2020 | Horn | |
| 11,555,282 B2 | 1/2023 | Barker | |
| 2017/0334343 A1 | 11/2017 | Kastanis | |
| 2020/0271295 A1 | 8/2020 | Miu | |
| 2021/0101521 A1 | 4/2021 | Johnson | |
| 2022/0003376 A1 | 1/2022 | Pickholz | |
| 2022/0003899 A1 | 1/2022 | Pickholz | |
| 2022/0090774 A1 | 3/2022 | Van Straten | |
| 2022/0325486 A1 | 10/2022 | Barker | |
| 2023/0349534 A1* | 11/2023 | Ruan | H05B 3/84 |

* cited by examiner

*Primary Examiner* — Sean P Gramling
(74) *Attorney, Agent, or Firm* — McGarry Bair PC

(57) ABSTRACT

A heated illumination assembly includes a light transmissive lens cover defining a first region and a second region. A first heater member having a first electrical resistance is disposed in the first region, and a second heater member having a second electrical resistance different from the first resistance is disposed in the second region. A controller module is configured to selectively electrically couple at least one of the first heater member and the second heater member to at least one power source, based on an input signal.

20 Claims, 7 Drawing Sheets

HEATED ILLUMINATION ASSEMBLY

TECHNICAL FIELD

The disclosure generally relates to lighting and illumination assemblies, and more specifically to a heated illumination assembly, such as for use with a vehicle.

BACKGROUND

Lighting and illumination assemblies or systems are included with vehicles or utility vehicles, including trucks, automobiles, watercraft, aircraft, sporting vehicles, or the like. Such lighting and illumination assemblies or systems can function to improve visibility for a vehicle operator, such as a driver, or to improve awareness of a vehicle observer, by making the vehicle more identifiable, such as by drawing an observer's attention to the vehicle.

BRIEF DESCRIPTION

An aspect of the present disclosure relates to a heating system for an illumination assembly. The heating system includes a lens cover defining a first region and a second region. A first heater member having a first electrical resistance is disposed in the first region to heat the first region, and a second heater member having a second electrical resistance different from the first electrical resistance is disposed in the second region to heat the second region. The first heater member and the second heater member are configured to be selectively electrically coupled to at least one power source to receive at least one of a first current and a second current, respectively therefrom. A controller module is arranged to receive at least one input signal, and configured to selectively electrically couple at least one of the first heater member and the second heater member to the at least one power source, based on the at least one input signal.

BRIEF DESCRIPTION OF THE DRAWINGS

A full and enabling disclosure of the present description, including the best mode thereof, directed to one of ordinary skill in the art, is set forth in the specification, which makes reference to the appended figures, in which.

DETAILED DESCRIPTION

Figure 1:
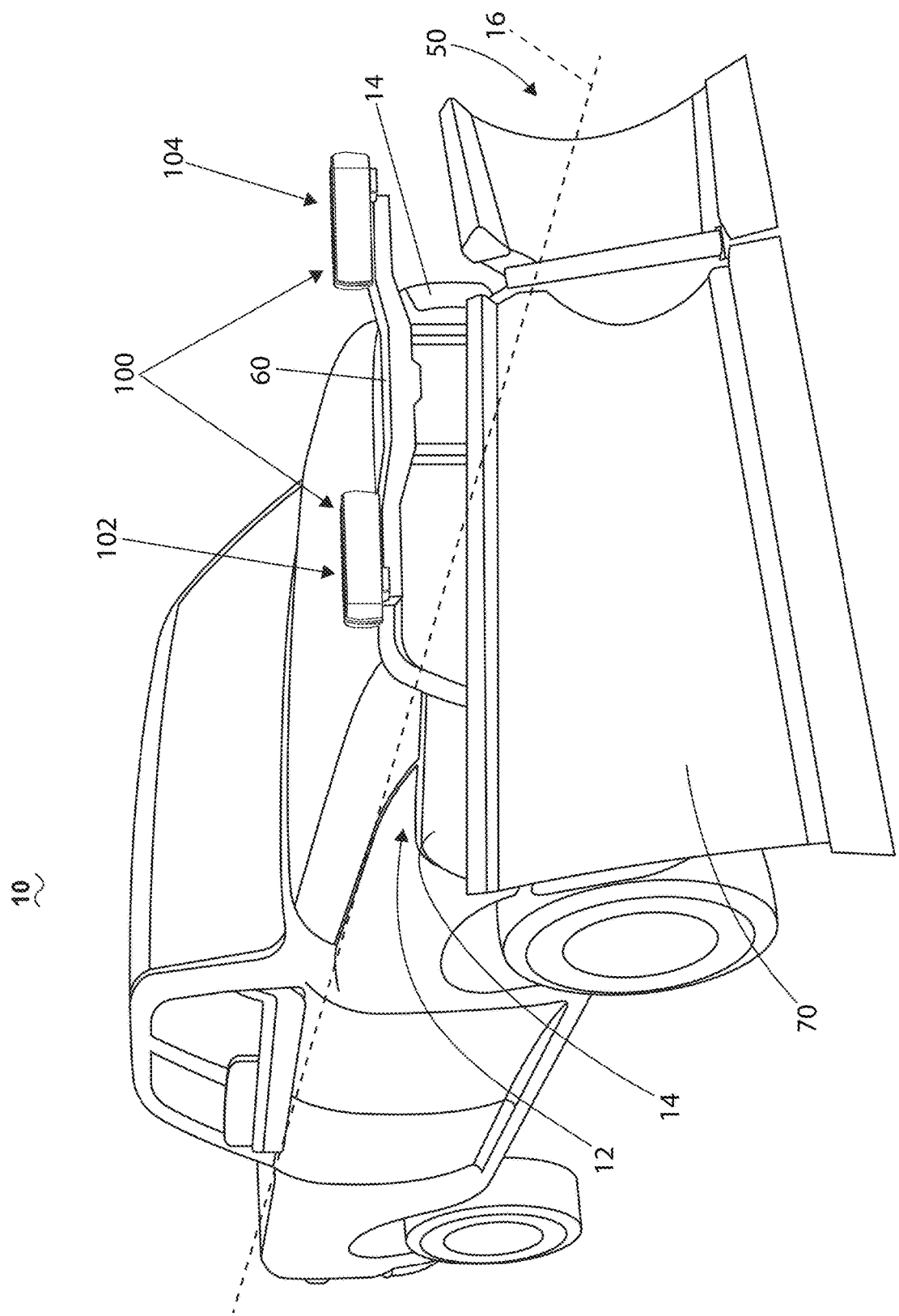
FIG. 1 is a schematic perspective illustration of a vehicle including a heated illumination assembly, according to an aspect of the present disclosure.

Aspects of the disclosure can be implemented in any environment suitable for illumination, illumination accessory, lighting elements, or the like. One non-limiting example of a stated environment can include, but is not limited to a vehicle, for performing an illumination task or achieving an illumination goal for the vehicle. Non-limiting examples of vehicles can include, but are not limited to, automobiles, aircraft, watercraft, manned or autonomously-controlled vehicles, sport utility vehicles, off-road vehicles, utility vehicles, emergency vehicles, specific-purpose machines or vehicles (farming equipment, construction vehicles, or the like), or the like. In another, or an additional, example, non-limiting aspects of the disclosure can be included with vehicles including, fitted with, or otherwise carrying additional components or mounts (hereafter, "vehicle accessories"), such as spades, shovels, plows, digging or earth-moving components, mounts or assemblies of one or more of these examples, or the like. In this sense, non-limiting aspects of the disclosure can be included where, for example, aspects of the disclosure can be implemented on, at, or with the vehicle, on, at, or with a set of vehicle accessories, or a combination thereof.

As used herein, the term "set" or a "set" of elements can be any number of elements, including only one. As used herein, the terms "axial" or "axially" refer to a dimension along an axis of a component referenced. The term "forward" used in conjunction with "axial" or "axially" refers to moving in a direction toward another component or point of reference (such a direction of movement or traversal). The term "rear," "rearward," or the like, when used in conjunction with "axial" or "axially" refers a direction away or distal from another component or point of reference (such a direction of movement or traversal).

Additionally, as used herein, the terms "radial" or "radially" refer to a direction away from a common center or axis. For example, in the overall context of one non-limiting example of an automobile, a major longitudinal axis can be defined through the center of the automobile and extending from the front of the automobile (relative to the direction of forward travel) through the rear of the vehicle. In this example, radial can refer to a direction extending away from the longitudinal axis of the automobile, such as laterally (with reference to, for example, Earth horizon) along the vehicle, toward an axial edge, such as a surface including door handles (e.g., perpendicular to the major longitudinal axis). The use of the terms "proximal" or "proximally," either by themselves or in conjunction with the terms "radial" or "radially," refers to moving in a direction toward the center longitudinal axis, or a component being relatively closer to the center longitudinal axis as compared to another component.

Also as used herein, while sensors can be described as "sensing" or "measuring" a respective value, sensing or measuring can include determining a value indicative of or related to the respective value, rather than directly sensing or measuring the value itself. The sensed or measured values can further be provided to additional components. For instance, the value can be provided to a controller module or processor, and the controller module or processor can perform processing on the value to determine a representative value or an electrical characteristic representative of said value.

Additionally, while terms such as "voltage", "current", and "power" can be used herein, it will be evident to one skilled in the art that these terms can be interrelated when describing aspects of the electrical circuit, or circuit operations.

As used herein, the term "electrically insulative", "insulator", or "insulation" refers to a material that exhibits a low electrical conductivity (for example, less than about $10^{-8}$ siemens per meter (S/m)). Unless stated otherwise, as used herein, the term "insulation" or "insulative" refers to electrical insulation or electrically insulative properties.

As used herein, the term "conductivity" refers to a property of a material that allows a flow of charge or electric current therethrough. Also as used herein, the term "electrical conductor" refers to a material that exhibits a relatively high electrical conductivity (for example, greater than about $10^{-7}$ S/m). Unless stated otherwise, as used herein, the term "conductive" refers to electrical conductivity, and the term "conductor" refers to an electrical conductor.

As used herein, the term "semi-conductive" refers to a property of a material having an electrical conductivity value falling between that of a conductor, and an insulator (for example, less than about 10-7 S/m and greater than about 10-8 S/m). Also as used herein the term "semi-conductor" refers to a semi-conductive material.

As used herein the term "resistance", or "electrical resistance" refers to the relative opposition of an object or element to electrical current flow through it, and can be measured in ohms. Also, as used herein, the term "resistivity", or "electrical resistivity" refers to a property of a material forming an object or element, indicative of an opposition to the movement of electrons across or through the material, and can be calculated, for example, as the product of the resistance of the material and the ratio of the cross-sectional area of the material and the length of the material. Unless otherwise indicated, the terms "resistance" and "resistivity" refer to an electrical resistance and an electrical resistivity, respectively.

As used herein, elements being "electrically connected," "electrically coupled," or "in signal communication" can include an electric transmission or signal being sent, received, or communicated to or from such connected or coupled elements. Furthermore, in various aspects, such electrical connections or couplings can include a wired or wireless connection, or a combination thereof.

Also as used herein, a "switch" or switching device refers to an electrical device or set of devices that are controllable to toggle between a first mode of operation, wherein the switch is "closed" intending to transmit current from a switch input to a switch output, and a second mode of operation, wherein the switch is "open" intending to prevent current from transmitting between the switch input and switch output. In non-limiting examples, connections or disconnections, such as connections enabled or disabled by a controllable switching element, can be selectively configured to provide, enable, disable, or the like, an electrical connection between respective elements. As used herein, a switch can include analog and digital devices, or combinations thereof.

For example, some aspects can employ silicon carbide (SiC) switches such as SiC metal-oxide-semiconductor field-effect transistors (MOSFETs) or insulated-gate bipolar transistors (IGBTs). Each switch can be operated or toggled by a respective gate drive circuit which can selectively provide a control signal to a gate terminal of the switch to transition the switch between conducting and non-conducting states. Although various non-limiting aspects are depicted and described herein using various switching devices including MOSFETS or IGBTs or a combination thereof, other aspects are not so limited. Other non-limiting aspects can include any desired switching device that can switch a state between a low resistance state and a high resistance state in response to an electrical signal. For example, the switching devices in various aspects can comprise, without limitation, any desired type of switching element including for example, transistors, gate commutated thyristors, field effect transistors (FETs), IGBTs, MOSFETs, gate turn-off thyristors, static induction transistors, static induction thyristors, or combinations thereof, and combinations thereof.

All directional references (e.g., radial, axial, upper, lower, upward, downward, left, right, lateral, front, back, top, bottom, above, below, vertical, horizontal, clockwise, counterclockwise) are only used for identification purposes to aid the reader's understanding of the disclosure, and do not create limitations, particularly as to the position, orientation, or use thereof. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to each other. In non-limiting examples, connections or disconnections can be selectively configured to provide, enable, disable, or the like, an electrical connection between respective elements. Non-limiting example power distribution bus connections or disconnections can be enabled or operated by way of switching, bus tie logic, or any other connectors configured to enable or disable the energizing of electrical loads downstream of the bus. Additionally, as used herein, "electrical connection" or "electrically coupled" can include a wired or wireless connection.

Additionally, as used herein, a "controller" or "controller module" can include a component configured or adapted to provide instruction, control, operation, or any form of communication for operable components to affect the operation thereof. A controller module can include any known processor, microcontroller, or logic device, including, but not limited to: field programmable gate arrays (FPGA), an application specific integrated circuit (ASIC), a full authority digital engine control (FADEC), a proportional controller (P), a proportional integral controller (PI), a proportional derivative controller (PD), a proportional integral derivative controller (PID controller), a hardware-accelerated logic controller (e.g. for encoding, decoding, transcoding, etc.), the like, or a combination thereof. Non-limiting examples of a controller module can be configured or adapted to run, operate, or otherwise execute program code to effect operational or functional outcomes, including carrying out various methods, functionality, processing tasks, calculations, comparisons, sensing or measuring of values, or the like, to enable or achieve the technical operations or operations described herein. The operation or functional outcomes can be based on one or more inputs, stored data values, sensed or measured values, true or false indications, or the like. While "program code" is described, non-limiting examples of operable or executable instruction sets can include routines, programs, objects, components, data structures, algorithms, etc., that have the technical effect of performing particular tasks or implement particular abstract data types. In another non-limiting example, a controller module can also include a data storage component accessible by the processor, including memory, whether transient, volatile or non-transient, or non-volatile memory.

As used herein, a "module" that includes or incorporates, runs, operates, or otherwise executes or produces a functional operation or operative outcome, can be incorporated within or included by way of program code stored in a memory or executed by a controller module or processor.

Additional non-limiting examples of the memory can include Random Access Memory (RAM), Read-Only Memory (ROM), flash memory, or one or more different types of portable electronic memory, such as discs, DVDs, CD-ROMs, flash drives, universal serial bus (USB) drives, the like, or any suitable combination of these types of memory. In one example, the program code can be stored within the memory in a machine-readable format accessible by the processor. Additionally, the memory can store various data, data types, sensed or measured data values, inputs, generated or processed data, or the like, accessible by the processor in providing instruction, control, or operation to affect a functional or operable outcome, as described herein. In another non-limiting example, a control module can include comparing a first value with a second value, and operating or controlling operations of additional components based on the satisfying of that comparison. For example, when a sensed, measured, or provided value is compared with another value, including a stored or predetermined value, the satisfaction of that comparison can result in actions, functions, or operations controllable by the controller module. As used, the term "satisfies" or "satisfaction" of the comparison is used herein to mean that the first value satisfies the second value, such as being equal to or less than the second value, or being within the value range of the second value. It will be understood that such a determination may easily be altered to be satisfied by a positive/negative comparison or a true/false comparison. Example comparisons can include comparing a sensed or measured value to a threshold value or threshold value range.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

The exemplary drawings are for the purposes of illustration only and the dimensions, positions, order and relative sizes reflected in the drawings attached hereto can vary.

Illumination assemblies, such as illumination assemblies for a vehicle, may be attached to the vehicle itself or an accessory feature (e.g., a snowplow). Typically, the illumination assemblies include a housing to support and enclose a light source such as a light emitting diode (LED), incandescent filament bulb, or the like. A light transmissive lens or lens cover can be attached to the housing to form part of the enclosure and is operative to allow light emitted from the light source to pass therethrough to illuminate an area external to the housing.

In certain environments, the light transmissive lens cover can be subject to moisture accumulation such as snow and ice accumulation on an outer surface of the lens cover and condensate accumulation on an inner surface of the lens cover. The moisture accumulation can undesirably cover, block, or otherwise reduce the transmission of light through the lens cover. For example, LEDs generate relatively little heat, making moisture accumulation on the lens cover a problem in certain instances.

In some known solutions, a heat source is provided on or proximal to the lens cover to evenly heat the lens cover to reduce or eliminate the moisture accumulations. However, in many cases, not all portions of the lens cover have an equal level of criticality or priority for heating or moisture reduction. For example, in some cases, some portions of the lens cover may be non-aligned or only partially aligned with the light source. As such, a non-aligned portion of the lens cover can be considered to have a lower priority for heating than another portion of the lens cover that is in alignment with the light source. Equally heating all portions of the lens cover regardless of their relative priority can reduce the operating efficiency of the illumination assemblies. Furthermore, excess heating of the lens cover can result in unnecessary material degradation of the lower priority portions of the lens cover.

Aspects as disclosed herein can overcome or mitigate these noted shortcomings of conventional heated lighting or heated illumination assemblies by selectively heating different portions of the lens cover using heater members having different relative characteristics, for example length and/or electrical resistance, with respect to each other.

While aspects of the disclosure are described and discussed herein, for case of understanding and description, in the exemplary context of a heated illumination assembly for use with a vehicle, other aspects are not so limited. It is contemplated that aspects as disclosed herein can include any desired application or environment, including non-vehicular applications, such as heated illumination assemblies for use in, without limitation, any number of residential, commercial and industrial applications.

FIG. 1 illustrates a schematic representation of a vehicle 10, such as, but not limited to, a utility vehicle, a truck, or other suitable type of vehicle for use by an operator, driver, or the like. In one non-limiting example, the utility vehicle can include a snowplow, a shovel, or another component mounted at or proximate to a front 12 of the vehicle for use in operation to perform a vehicle function, such as moving snow. The vehicle 10 can include a pair of illumination assemblies 14 (e.g., headlights). Additional examples of vehicles, additional components, or operations are envisioned incorporating aspects of the disclosure. In the illustrated non-limiting example, the vehicle can include a snowplow assembly 50 mounted on, at, or otherwise with the vehicle 10. In non-limiting examples, the snowplow assembly 50 can be mounted or supported by the vehicle 10 by way of mechanical attachment with one or more aspects of the vehicle 10 frame or chassis (not shown). Mounting or attaching aspects of the snowplow assembly 50 are not germane to aspects of the disclosure.

In non-limiting examples of the disclosure, the snowplowing assembly 50 can include a structural snowplow frame 60, mounted or mechanically coupled with the vehicle 10, a shovel or snowplow blade 70 supported by the snowplow frame 60, and a set of heated illumination assemblies 100, shown as two heated illumination assemblies 100 or a pair of heated illumination assemblies 100. By way of non-limiting example, the snowplow blade 70 can include any suitable type or shape of snowplow blade 70, such as a V-shaped snowplow blade, an angled or diagonally oriented snowplow blade, a movable or articulating snowplow blade, a multiple segment blade, or a combination thereof, and can have any suitable height or width for installation with the vehicle 10, or suitable for operational uses.

The at least one heated illumination assembly 100 can be configured to provide illumination for the vehicle 10 operator, for observers of the vehicle 10, or for operations of the vehicle 10, as described herein. As shown, the set of heated illumination assemblies 100 can be mounted or mechanically coupled on, at, or with, the snowplow frame 60, and can be oriented, positioned, directed, or otherwise aligned to illuminate or project illumination or light in at least two directions, as described herein. While the set of heated illumination assemblies 100 are shown and described as mounted with the snowplow frame 60, additional non-limiting aspects of the disclosure can be included whereby, for example, the set of heated illumination assemblies 100 are mounted with additional or alternative supporting mechanical components. For instance, in one non-limiting example, the set of heated illumination assemblies 100 can be mounted with an arm or with respective arms supported by the snowplow frame 60, the vehicle 10, or a component thereof. As described herein, the mounting or mechanical coupling or fastening of the heated illumination assemblies 100 can be adapted, configured, oriented, or otherwise positioned such that the set of heated illumination assemblies 100 are located in a position relative to the vehicle 10, the snowplow assembly 50, the snowplow blade 70, or a subset thereof, such that the at least two directions of illumination defined by each of the set of heated illumination assemblies 100 are directed as described herein, without interruption, interference, or blocking the illumination pattern, in order to enable the operations of the vehicle 10 by the operator, the illumination for the vehicle 10 operator, the illumination for observers of the vehicle 10, or subset or combination thereof.

While not clearly shown in the perspective of FIG. 1, non-limiting aspects of the disclosure can include additional connections for each of the set of heated illumination assemblies 100 in addition to the mechanical couplings, including but not limited to, a power connection, a grounding connection, one or more control connections, or a combination thereof. Alternatively, or additionally, non-limiting aspects of the disclosure can be included wherein additional wireless, including wireless power transmission or wireless control connections can be enabled for respective power or control connections. It will be readily appreciated that the vehicle 10 can include a power source such as a DC battery and/or an alternator, to provide electrical power to various systems and components of the vehicle 10, and can further provide power to the set of heated illumination assemblies 100 via the power connections. It is also contemplated that the heated illumination assemblies 100 can have a dedicated or separate power source, such as a battery, supercapacitor, or the like, without departing from the scope of the disclosure.

Optionally, the mounting of at least one heated illumination assembly 100 can further include anti-vibration features, structures, locking, retention features, or the like. In another non-limiting example, the mounting, or the set of heated illumination assemblies 100 can include directional, positional, or "aiming" features for configuration or enabling the projection(s) of light in a suitable or customizable adaption, by way of the mounting of the at least one heated illumination assembly 100, or a subcomponent thereof. In such examples where the at least one heated illumination assembly 100 is mounted on or secured to the snowplowing assembly 50, the at least one heated illumination assembly 100 can be thought of as forming a part of the snowplowing assembly 50, such that the snowplowing assembly 50 comprises the at least one heated illumination assembly 100. For example, as shown, the vehicle 10 can include a first heated illumination assembly 102, or a "left" heated illumination assembly 102 (relative to the perspective of FIG. 1), and a second heated illumination assembly 104, or a "right" heated illumination assembly 104.

It will be understood that the at least one heated illumination assembly 100 can be provided at any suitable location on the vehicle 10 or on the snowplowing assembly 50, such that the heated illumination assembly 100 provides, enables, or allows for illumination or projection of light, for example to a driver or operator of the vehicle 10, such as during operation of the snowplowing assembly 50. In another example, as explained, the positioning of the heated illumination assembly 100, relative to the components or subcomponents of the vehicle 10 or snowplow assembly 50, can further ensure that the projection(s) of light are further not interrupted, blocked, or otherwise prevented by the additional components of the vehicle 10, such as the snowplow assembly 50. The projections of light can further alert pedestrians, other motorists, or any observers of the light to the presence or operation of the vehicle 10 and the snowplowing assembly 50.

In another non-limiting example aspect of the disclosure, the set of heated illumination assemblies 100 can be auxiliary heated illumination assemblies 100, or supplemental heated illumination assemblies 100. As used herein, "auxiliary" or "supplemental" assemblies indicates that the vehicle 10 can include original equipment manufacturer (OEM) illumination components or elements, and that the set of heated illumination assemblies 100 can be in addition to the OEM illumination components.

Figure 2:
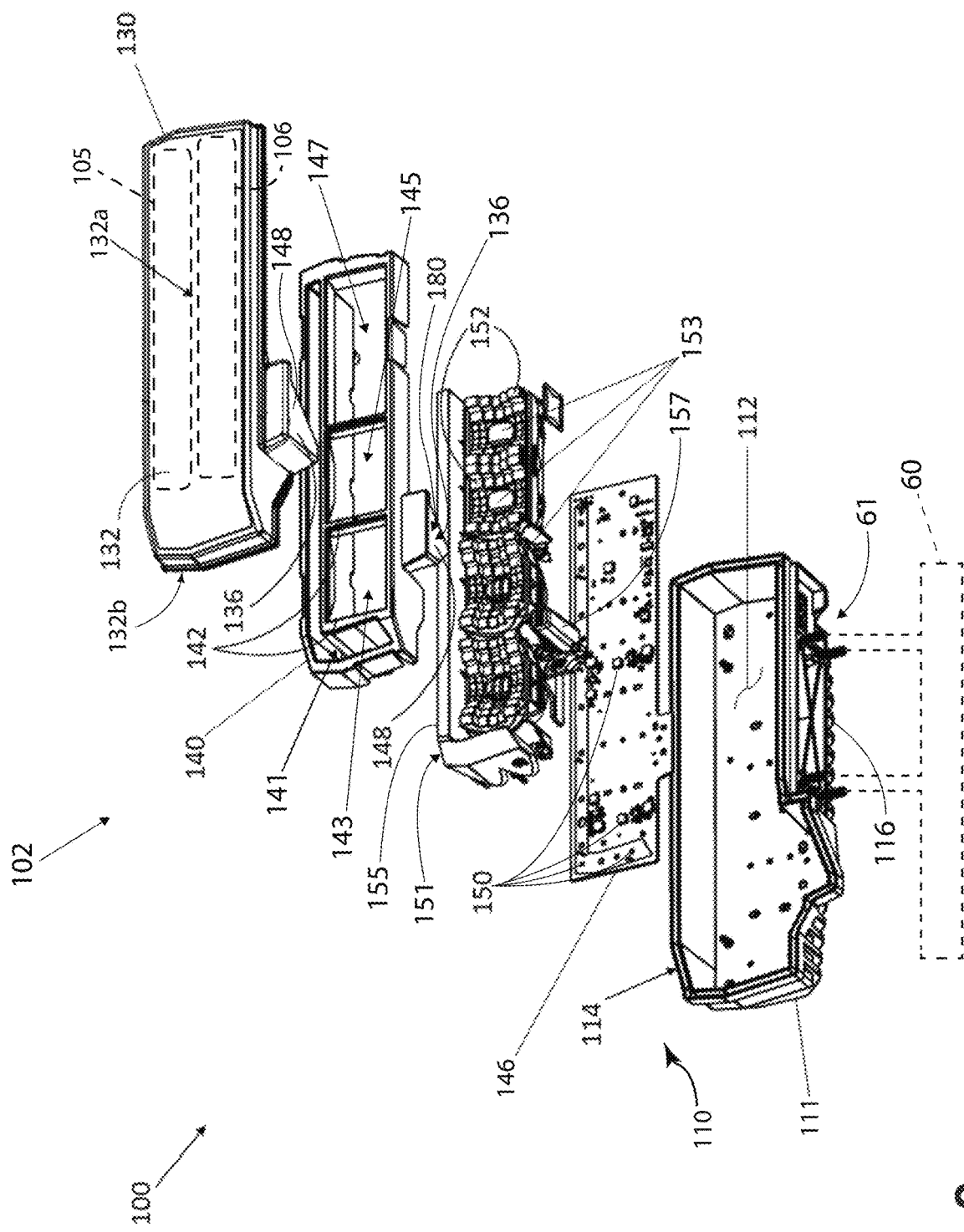
FIG. 2 is a partially exploded perspective view of the heated illumination assembly of FIG. 1, according to an aspect of the present disclosure.

Referring now to FIG. 2, one non-limiting aspect of a heated illumination assembly 100 is shown in a partially exploded perspective view, with some parts omitted for clarity. The heated illumination assembly 100 comprises a housing 110 including a base 111 at least partially defining an interior 112 with an open face 114, and a lens cover 130 coupled to the base 111. In non-limiting aspects, the housing 110 can include a heat sink 116. Some non-limiting aspects of the heated illumination assembly 100 can further comprise a frame 140 positioned behind the lens cover 130, such as by being located at or at least partially within the open face 114 of the housing, such that the lens cover 130 at least partially overlies the frame 140. The frame 140 can at least partially define at least a set of areas, windows, or illumination openings, shown as a first passthrough 141, a second passthrough 143, a third passthrough 145, and a fourth passthrough 147.

The lens cover 130 can define a front face 132 and a bottom face 136. The front face 132 can include an outward facing surface 132*a* (e.g. facing away from the base 111) and an opposing inward facing surface 132*b* (e.g., facing toward the base 111). Also illustrated in dashed outline are a first region 105 and a second region 106. As illustrated, the first region 105 and the second region 106 are merely representative indication of one non-limiting aspect of a set or subset of regions 105, 106.

In non-limiting examples, at least a subset of the first region 105, and at least a subset of the second region 106 can represent or indicate or otherwise correspond to a front-facing light emittance or illumination source, such a daytime running lights, low-bean lights, high-beam lights, or a subset, or a combination thereof, with respect to the vehicle 10 (FIG. 1). In another non-limiting example, one of the first region 105 or second region 106, or a portion thereof can represent or indicate a front-facing light emittance, forward illuminator, or illumination source, such as a turn signal indicator. Non-limiting examples of the disclosure can be included wherein, for example, the set or a subset of the first region 105 or the second region 106, or a portion thereof, can include different, variable, or selectable brightness illumination output(s), with respect to each other. In other non-limiting examples, the set or subset of the first region 105 or second region 106, or a portion thereof can include different, variable, or selectable color (e.g., light attenuation, filtering of wavelength or wavelength ranges, etc.) output(s), independently controllably (e.g., on/off/color/brightness control), or a combination thereof, with respect to each other. Non-limiting aspects of the disclosure can be included wherein the heated illumination assembly 100 can include at least two different illumination outputs, at least two different illuminators, or the like.

It will also be understood that at least a portion of the lens cover 130 can have a smooth outward facing surface 132*a*, whether or not such surface is planar or non-planar. The lens cover 130 can have a uniform thickness throughout or can have a variable thickness. In non-limiting examples, a variable thickness or uniform thickness of the lens cover 130 can be selected to define the cantilevered mass of the housing 110 or the heated illumination assembly 100. The lens cover 130 can have a uniform color throughout (e.g., light attenuation, filtering of wavelength or wavelength ranges, etc.), or can have at least one portion that differs in color from at least one other portion of the lens cover 130. Additional or alternative aspects of the disclosure can be included wherein, for example, optical attenuation properties can be varied at different portions of the lens cover 130. For instance, optical attenuation properties can include different optical density attenuation properties, transparency properties, opacity properties, colorizing properties (e.g. portions having a more color of different color relative to a different portion), the like, or a combination thereof. For instance, the lens cover 130 can include optical attenuation properties to ensure transparency to allow maximum light transmission. The lens cover 130 can optionally further include logo or branding features (not shown), which can appear illuminated depending on their placement on the lens cover 130.

Non-limiting aspects of the disclosure can be included wherein at least a subset of illumination passthroughs 141, 143, 145, 147 can be aligned with, in alignment with, or are registered with or to a respective set or subset of the light-emitting regions of the lens cover 130, such as the first region 105 or the second region 106. Also, at least a portion of the bottom face 136 can include a downward-facing illumination area 148. Non-limiting aspects of the disclosure can also include at least one downward-facing passthrough 180, areas of illumination, or the like. As illustrated, at least a subset of illumination passthroughs 141, 143, 145, 147, 180 can include an opening defined by the frame 140.

The heated illumination assembly 100 further comprises a first printed circuit board (PCB) 146 received within the interior 112 of the base 111, and can include or be coupled to at least one light source 150 operably and electrically coupled with the first PCB 146 The light sources 150 can be any suitable type of light source, non-limiting examples of which include light bulbs, light emitting diodes (LEDs), which can be uniform or can vary in color, combinations of colors, intensity, etc.

The at least one light source 150, including a set of light sources 150, is provided with and at least partially aligned with, registered to, a lens housing 151 defining at least a corresponding set of lens 153, reflector elements 152, light pipes or light guides 155, multi-faceted surfaces, arrays, or a combination thereof, and configured for directing, angling, reflecting, refracting, or otherwise aiming an illumination output from the corresponding at least one light source 150 outward away from the heated illumination assembly 100, as described herein. In non-limiting examples, aspects of the disclosure can include a corresponding set of lens 153, reflector elements 152, light pipes or light guides 155, multi-faceted surfaces, arrays, or a combination thereof, and configured for directing, angling, reflecting, refracting, or otherwise aiming an illumination output from the corresponding for each light source 150, or for a set or subset of light sources 150. The heated illumination assembly 100 can further include a lighting element 157 aligned with, registered with, or otherwise associated with at least one light source 150, and configured or arranged to direct, angle, reflect, refract or otherwise aim an illumination output from the corresponding at least one light source 150 downwardly, relative to the heated illumination assembly 100, such as through the at least one downward-facing passthrough 180. In this sense, the lighting element 157 can be aligned with or registered with the downward-facing passthrough 180.

While FIG. 2 illustrates one non-limiting set of illumination passthroughs 141, 143, 145, 147, aspects of the disclosure are not limited to only the illustrated example. One or more of the subset of illumination passthroughs 141, 143, 145, 147 can be included in aspects of the disclosure, including different or alternative geometric designs, openings, alignments with respective or alternative subsets of light sources 150, different output purposes (e.g., low-beam forward illuminator, high-beam forward illuminator, turn signal forward illuminator design or placement), or the like.

Additionally, while FIG. 2 illustrates one non-limiting set of light-emitting regions of the lens cover 130, such as the first region 105 and the second region 106, aspects of the disclosure are not limited to only the illustrated example. In other aspects, the lens cover 130 can include any desired number of light-emitting regions, including aspects having different or alternative geometric designs, shapes, alignments with respective or alternative subsets of light sources 150, different output purposes (e.g., low-beam forward illuminator, high-beam forward illuminator, turn signal forward illuminator design or placement), or the like.

While further shown in dotted outline as one non-limiting example, the heated illumination assembly 100, such as a portion of the housing 110, can include mounting elements 61, shown aligned with and mountable with an example aspect of a portion of the snowplow frame 60. The mounting elements 61 can include any form of pins, fasteners, clamps, or the like, enabling the mounting of the heated illumination assembly 100 with at least a portion of the snowplow frame 60, the snowplow assembly 50, or any portion of a vehicle 10. Additionally, or alternatively, as described herein, non-limiting aspects of the disclosure can be included wherein, for example, the mounting elements 61, the housing 110, or the heated illumination assembly 100 can be directionally, positionally, or otherwise implement an "aiming" feature for configuration or enabling the projection(s) of light in a suitable or customizable adaption, by way of the mounting of the at least one heated illumination assembly 100, such as relative to the snowplow frame 60, the snowplow assembly 50, or any portion of a vehicle 10, or a subcomponent thereof.

The housing 110 can define a symmetrical or evenly distributed shape for the heated illumination assembly 100, or the housing 110 can have a non-symmetrical shape or a sided shape, as explained herein. For example, as the illustrated heated illumination assembly 100 is shown laterally left of the axis 16 (FIG. 1), the heated illumination assembly 100 can include the first heated illumination assembly 102 having an asymmetric orientation of a set or subset of components. In one non-limiting example, a second heated illumination assembly 104 (FIG. 1) can include a mirrored configuration or assembly, with mirroring relative to the axis 16, or mirrored relative to the axial ends of the first heated illumination assembly 102. In non-limiting examples, the first and second heated illumination assemblies 102, 104 can be oriented or arranged, respectively, about additional vehicle 10 features, such as including placement or orientation relative to the driver side or the passenger side of the vehicle 10. In another non-limiting example, the heated illumination assembly 100 can be mounted or supported (for example, by the snowplow frame 60 or snowplow assembly 50, neither shown in FIG. 2) such that the heated illumination assembly 100 has a cantilevered mass. In another non-limiting example, the housing 110 can define or include a cantilevered mass or a reduction in cantilevered mass, based on the composition, composition, construction, or mounting of the housing 110 or heated illumination assembly 100.

As shown in FIG. 2, the heat sink 116 can include a rear facing (in the perspective of FIG. 2) housing configured or otherwise adapted to remove heat generated at, by, or within the housing 110 by way of convection, radiation, conduction, or a combination thereof. By way of non-limiting example, it is contemplated that the base 111 can be formed of an opaque material, while the lens cover 130 is formed of a transparent or at least partially transparent or light-transmissive material. It is further contemplated that the base 111 can be formed of a material that is thermally conductive and dissipative, as well as corrosion resistant, and can define various other structural features, such as for integration of the base 111 with the lens cover 130, with the heat sink 116, with various electronic, control, or optics elements, or mounting features (including optional alignment or "aiming" features of the heated illumination assembly 100), such as for mounting or securing the heated illumination assembly 100 as a whole to the vehicle 10 (FIG. 1) or to the snowplowing assembly 50. The base 111 can have a uniform thickness throughout or can have a variable thickness.

In the illustrated non-limiting example of FIG. 2, the lens cover 130 is coupled to the base 111 such that the lens cover 130 closes or covers the open face 114 of the base 111 that provides access to the interior 112. The lens cover 130 can be coupled to the base 111 by any suitable fastening structure or method, non-limiting examples of which include by use of mechanical fasteners separate from the base 111 and the lens cover 130, by use of mechanical fastening structures or alignment structures or registration features formed by at least one of the base 111 and the lens cover 130, by an interference, friction, or snap fit between the base 111 and the lens cover 130, by adhesive material, welding, or combinations thereof, or by integral forming of the base 111 with the lens cover 130, etc. It is also contemplated that the lens cover 130 can be configured to couple with a separate, additional protective cover (not shown) to prevent damage during operation of the vehicle 10 or the snowplowing assembly 50 (FIG. 1), or the lens cover 130 can be provided with a coating that protects against debris, environmental exposure, UV exposure, and the like. In another non-limiting example, it is also contemplated that the lens cover 130 can be configured to couple with a separate, additional protective cover to prevent damage during non-operation (e.g., storage) of the vehicle 10, the snowplowing assembly 50, or the lens cover 130.

In normal operation, in some environmental conditions, the lens cover 130 can be subject to moisture accumulation such as fogging, frost, icing, and the like. The moisture accumulation can cover, block, or otherwise undesirably reduce the transmission of light through the lens cover 130. It will be appreciated that heating the lens cover 130 can reduce or eliminate such moisture accumulation. While not shown in FIG. 2, aspects as disclosed herein can include a heating system to selectively heat the lens cover 130. Furthermore, it is contemplated that the first region 105 and the second region 106 can be determined to have different relative heating requirements or priorities with respect to each other. Aspects as disclosed herein can operatively heat the first region 105 and the second region 106 using separate respective heating elements configured to conduct different respective electrical currents therethrough, resulting in conductive and convective heating of the lens cover 130.

Figure 3:
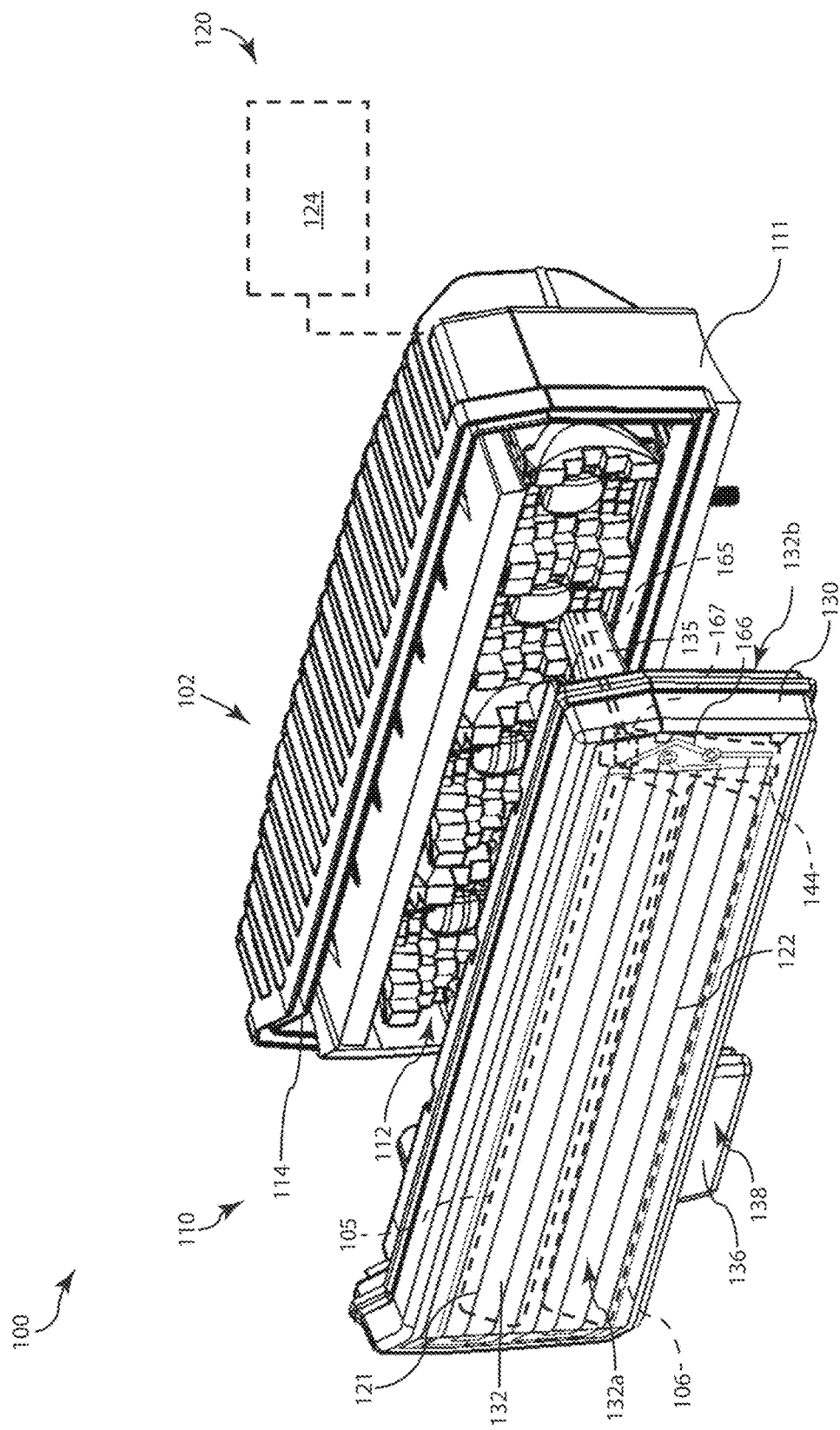
FIG. 3 is another partially exploded perspective view of the heated illumination assembly of FIG. 3, with some parts omitted for clarity, according to an aspect of the present disclosure.

Referring now to FIG. 3, the heated illumination assembly 100 of FIG. 2 is shown with the housing 110 in a partially exploded perspective view having the base 111 separated from the lens cover 130, with some parts omitted for clarity. The heated illumination assembly 100 can include a lens heating system 120 having a controller module 124 (shown in dashed outline) communicatively coupled to a first heater member 121 and a second heater member 122 disposed on at least one of the inward facing surface 132*b* or the outward facing surface 132*a* of the lens cover 130. More specifically, the first heater member 121 is disposed in the first region 105, and the second heater member 122 is disposed in the second region 106. In non-limiting aspects, a second PCB 144 (shown in dashed outline) can be coupled to the inward facing surface 132*b* the lens cover 130. The second PCB 144 can be coupled to the lens cover 230 using rigid fasteners (e.g., rivets), adhesive, insert molding, resilient members, or the like. A first connector 167 can be mounted or coupled to the second PCB 144. The second PCB 144 can include a set of electrically conductive traces 166. The electrically conductive traces 166 can be electrically coupled to the first connector 167. The first heater member 121 and the second heater member 122 can be electrically coupled to respective electrically conductive traces 166 defined on the second PCB 144. In some aspects, the housing 110 can also include a connector guide member 135. The connector guide member can be configured to support a set or a subset of electrical power lines 165, communication lines (FIG. 6), control lines (not shown) or the like. In non-limiting aspects, the electrical power lines 165 can be electrically coupled at a first end to the first connector 167. For example, in nonlimiting aspects, the first heater member 121 and the second heater member 122 can be electrically coupled to the set of electrical power lines 165 via the electrically conductive traces 166 and the first connector 167.

It should be appreciated that although the illustrated aspect of FIG. 3 depicts at least two light-emitting regions of the lens cover 130, shown as a first region 105, and a second region 106, each having a respective heater member, shown as a first heater member 121 and a second heater member 122, other aspects are not so limited. In other aspects, the lens cover 130 can have any desired number of light emitting regions, having any desired number of heater members disposed in any number of the light emitting regions, without departing from the scope of the disclosure. Furthermore, while FIG. 3 depicts the first region 105 and second region 106 as being rectangular in shape, and being substantially equal in size, other aspects are not so limited. in various non-limiting aspects, the first region 105 and the second region 106 can have any desired shape, orientation, size, or relative spatial relationship with respect to each other. For example, in non-limiting aspects the first region 105 and the second region 106 can have different shapes with respect to each other. In still other aspects, the first region 105 and the second region 106 can be arranged on different light-emitting regions of the lens cover 130 than each other.

Figure 4:
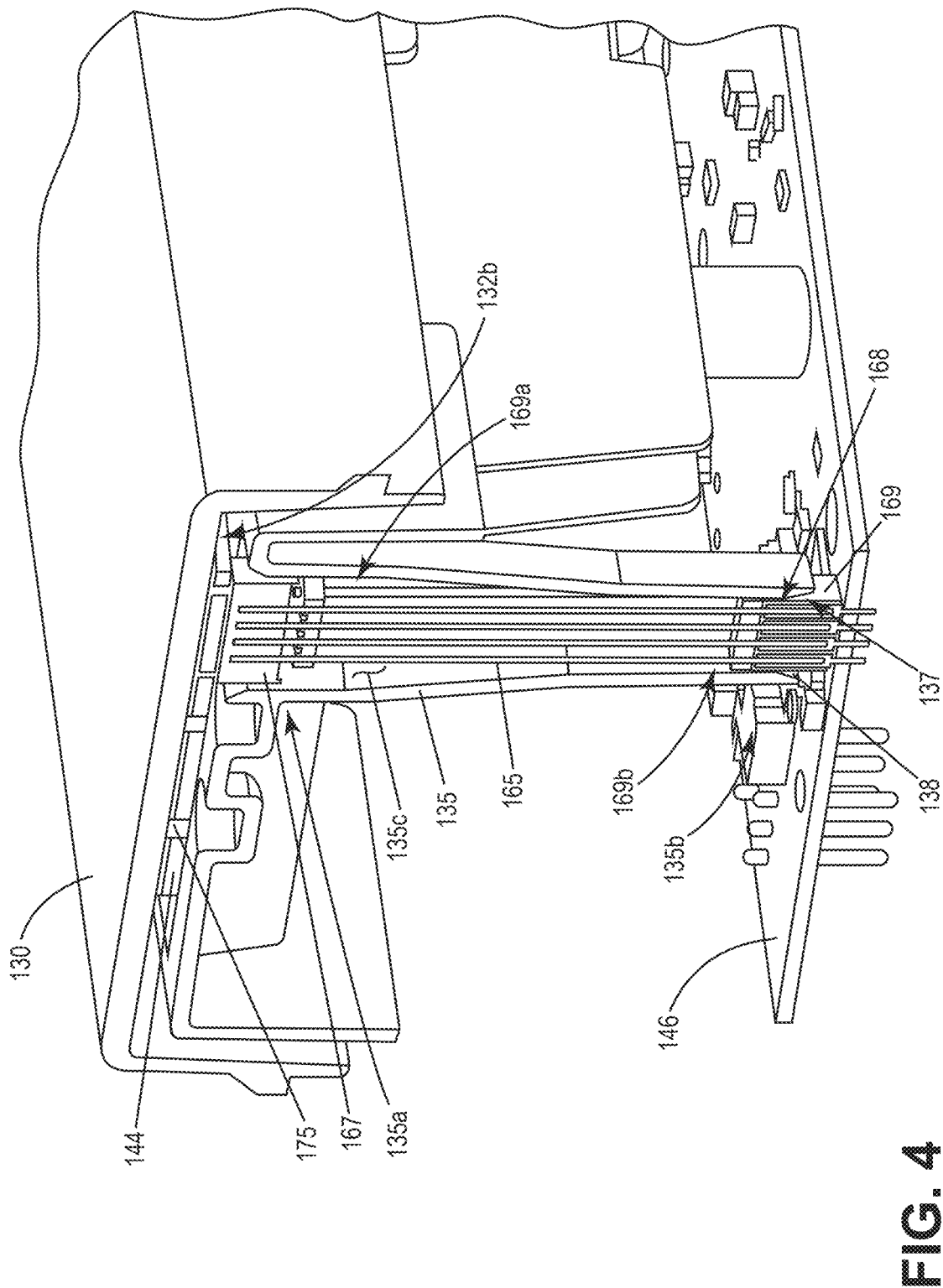
FIG. 4 is a perspective view of a portion of the heated illumination assembly of FIG. 3, according to an aspect of the present disclosure.

FIG. 4 depicts a perspective view of a non-limiting aspect of a portion of the lens cover 130 insertably coupled to the first PCB 146 and fixedly coupled to the second PCB 144 with the second PCB 144 spaced from the first PCB 146. As illustrated, the second PCB 144 is fastened to the lens cover 130 via a set of rivets 175. The first connector 167 is mounted or coupled to the second PCB 144. The second connector 169 can be mounted on or supported by the first PCB 146. The connector guide member 135 can extend from a first end 135a at the second PCB 144 to an opposing second end 135b at the first PCB 146. The set or subset of electrical power lines 165 can be received in and/or supported by the connector guide member 135. In non-limiting aspects, the set or subset of electrical power lines 165 can be electrically coupled at a first end to the first connector 167, and electrically coupled at an opposing second end to the second connector 169. Each electrical power line 165 can include a respective terminal member 168 at the second end 168b configured to be electrically coupled to the second connector 169 and/or an electrical power source (not shown). The second PCB 144 can be electrically coupled to the first PCB 146 via an insertion of the set of terminal members 168 into the second connector 169.

The connector guide member 135 can be configured to facilitate an insertable connection of the set of terminal members 168 into the second connector 169. In various aspects, the connector guide member 135 can be rigid, or can be flexible or otherwise resilient. In non-limiting aspects, the second end 135b of the connector guide member can include a first surface 135c defining an alignment feature 137 at the second end 135b. For example, the alignment feature 137 can include a sloping edge or chamfer 138 defined by the first surface 135c at the second end 135b. In other non-limiting aspects, the alignment feature 137 can define a complementary geometry corresponding to a geometry defined by the second connector 169. The alignment feature 137 is configured guide an insertable electrical coupling of at least one of the set of terminal members 168 into the second connector 169.

Furthermore, in non-limiting aspects, as illustrated the second PCB 144, the first connector 167, the rivets 175, and the connector guide member 135, and the set or subset of electrical power lines 165 can be disposed on the same end of the heated illumination assembly 100. In this way, the first heater member 121 and the second heater member 122 can be coupled to the conductive traces 166 (FIG. 3) at the same end of the heated illumination assembly 100. Thus, in such aspects, electrical power can be provided to the first heater member 121 and the second heater member 122 from the same end of the heated illumination assembly 100. Further still, in such aspects, the heated illumination assembly 100 can be mounted or supported (e.g., supported by the snowplow frame 60 or snowplow assembly 50 (FIG. 1)) at the same end as the first connector 167, the rivets 175, and the connector guide member 135, and the set or subset of electrical power lines 165 such that the heated illumination assembly 100 defines a cantilevered mass, and the first connector 167, the rivets 175, the connector guide member 135, and the set or subset of electrical power lines 165, or combinations thereof are disposed at a supported end of the cantilevered mass.

Figure 5:
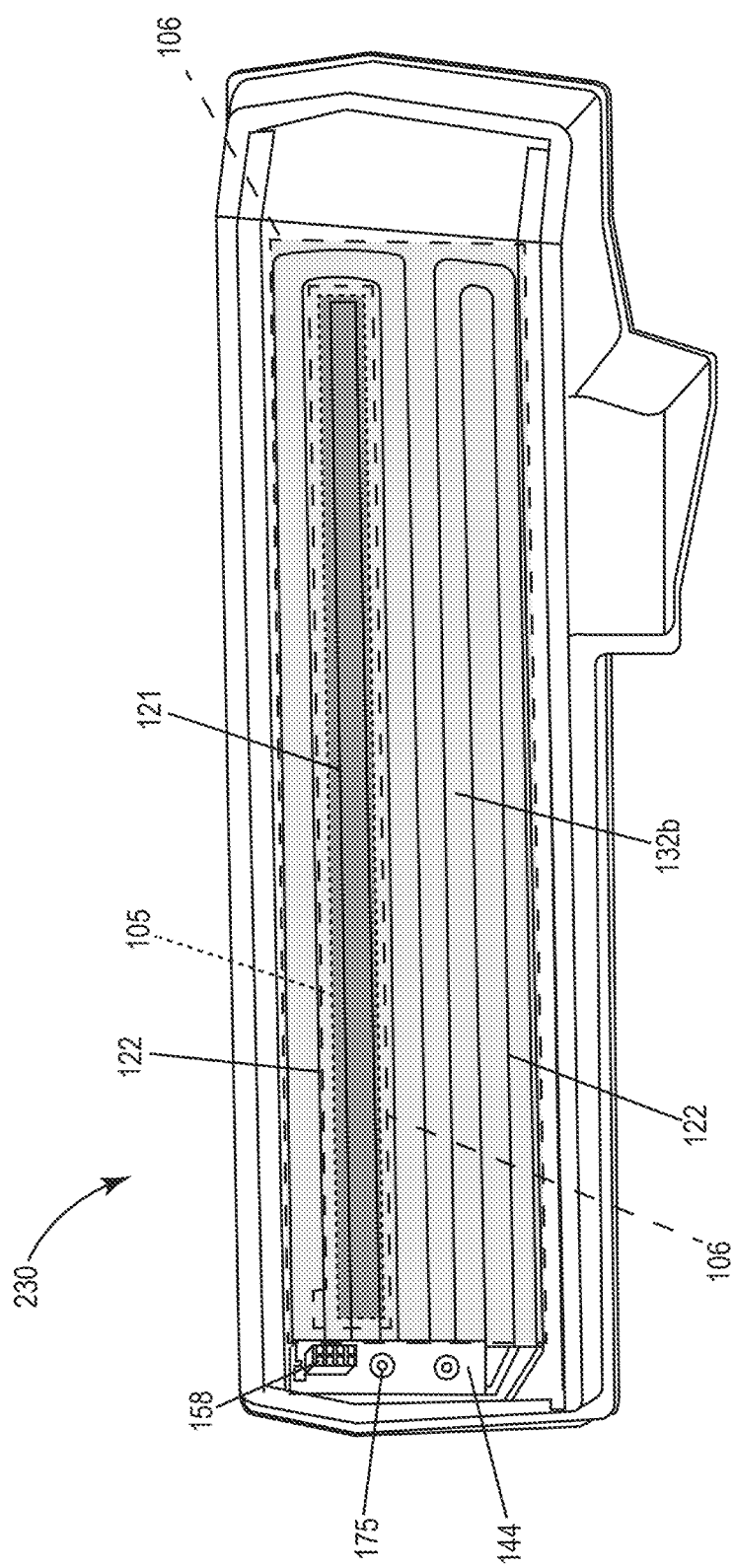
FIG. 5 is a perspective view of the lens cover of FIG. 2, according to an aspect of the present disclosure.

FIG. 5 depicts a perspective view of another non-limiting aspect of the lens cover 230. The lens cover 230 of FIG. 5 is similar to the lens cover 130 of FIG. 3, so like parts are labelled with like reference numbers. In the illustrated aspect, the lens cover 230 is viewed from an opposite side (e.g., viewing the inward facing surface 132b) from the lens cover 130 of FIG. 3. Another notable difference between the lens cover 230 of FIG. 5 and the lens cover 130 of FIG. 3 is that in the example lens cover 230 of FIG. 5, the first region 105 and second region 106 are depicted as having different shapes, and different sizes with respect to each other. For purposes of clarity, the first region 105 and the second region 106 are shaded in gray scale to highlight their respective geometries. For example, the first region 105 is depicted as generally rectangular, while the second region 106 is depicted as having a generally rectangular frame shape. Additionally, the second region 106 is depicted as larger than the first region 105 (e.g., the second region 106 having a greater total surface area than the first region 105). Furthermore, in the illustrated example, the first region 105 and second region are depicted as having a nested relationship, in which the second region 106 circumscribes or surrounds the first region 105. In this way, the first heater member 121 being disposed in the first region 105 can be circumscribed or surrounded by the second heater member 122 disposed in the second region 106.

In the non-limiting aspect of FIG. 5, the second PCB 144 is coupled to the inward facing surface 132b the lens cover 230 using the rivets 175. The first heater member 121 and the second heater member 122 are electrically coupled to respective electrically conductive traces 166 (FIG. 3) defined on the second PCB 144.

The first heater member 121 and the second heater member 122 can be elongate electrically conductive elements. For example, the first heater member 121 and the second heater member 122 can be electrically conductive wires (e.g., copper wires) disposed on at least one of the inward facing surface 132b or the outward facing surface 132a of the lens cover 230. In other aspects, the first heater member 121 and the second heater member 122 can include a conductive ink or film (e.g., a silver trace printed on a clear substrate film or thermoplastic polymer) positioned on at least one of the inward facing surface 132b or the outward facing surface 132a of the lens cover 230. In yet another example, the first heater member 121 and the second heater member 122 can comprise a transparent conductive film (e.g., having graphene or nanowire conductors) disposed on at least one of the inward facing surface 132b or the outward facing surface 132a of the lens cover 130.

The first heater member 121 can be configured to define a respective first path or topology within the first region 105. The second heater member 122 can be configured to define a respective second path or topology within second region 106. The respective first or second path, or portions thereof can be straight, curved, meandering, labyrinthine, or any desired shape or orientation without departing from the scope of the disclosure herein. Regardless of the shape, orientation, direction, path, or arrangement of the first and second heater members 121, 122, as used herein, the respective "length" or "overall length" of the first and second heater members 121, 122 refers to the total length of the member between a respective first end and a respective opposing second end. For example, in some aspects, the first end and opposing second end can be defined by a connection of the respective heater member 1221, 122 to the PCB 144. In non-limiting aspects the respective overall length of the first heater member 121, and the second heater member 122 can be non-equal. It will be appreciated that for the first and second heater members 121, 122 having unequal overall lengths with respect to each other, when formed from identical materials, or materials having substantially the same resistivity, the heater member 121, 122 having a greater overall length with respect to the other, will consequently exhibit a greater electrical resistance than the other.

It is contemplated that, under certain environmental conditions, not all light emitting regions of the lens cover 130, 230 have an equal need or urgency for removal or reduction of moisture accumulation with respect to other regions of the lens cover 130, and thus some light emitting regions can have a different need or urgency to be heated relative to other light emitting regions. For example, in one non-limiting aspect, the first region 105 may be determined to have a greater priority for moisture removal or reduction of accumulated moisture than the second region 106. As will be discussed in more detail herein, aspects can be configured to selectively provide more heat to the first region 105 than to the second region 106.

Figure 6:
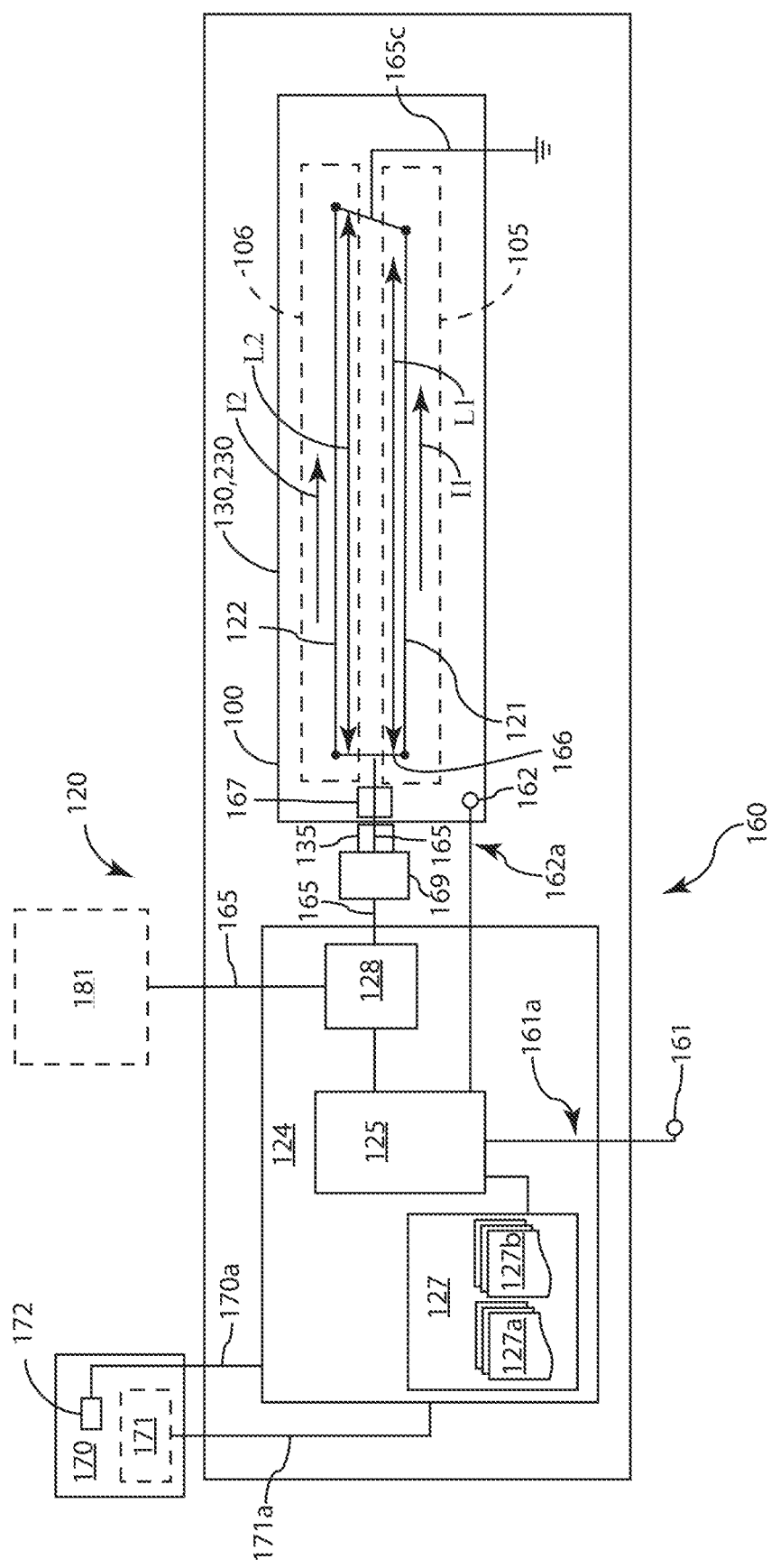
FIG. 6 is schematic block diagram of a heating system for use with the heated illumination assembly of FIG. 1, according to an aspect of the disclosure.

FIG. 6 is a schematic block diagram illustrating a non-limiting aspect of the lens heating system 120 including the controller module 124, lens cover 130, 230 having the first and second heater members 121, 122 coupled to the first connector 167 via the electrically conductive traces 166. The lens heating system 120 can also include a first electrical control device 128, the second connector 169, the set of electrical power lines 165, and a set of sensors 160. In some non-limiting aspects, the lens heating system 120 can further include a user interface 170. The controller module 124 can include a computing device such as a processor 125, and a memory 127 communicatively coupled to the processor 125. The user interface 170 can be communicatively coupled to the controller module 124 to provide a first input signal 170a thereto. A first power source 181 can be selectively electrically coupled via the first electrical control device 128 to the first heater member 121 and the second heater member 122 to provide electrical power thereto. The processor 125 can be further communicatively coupled to the first electrical control device 128 and the set of sensors 160.

The first power source 181 can be selectively electrically coupled to the first and second heater members 121, 122 via the first electrical control device 128, and the set of electrical power lines 165. In non-limiting aspects, the set of electrical power lines 165 can include a ground line 165c. Although not shown for clarity, it will be appreciated that in non-limiting aspects, the first power source 181 can be further electrically coupled to the controller module 124 to provide electrical power thereto.

In an aspect, the first power source 181 can include a battery of the vehicle 10 (FIG. 1) for example, a lithium-ion rechargeable battery, a lead-acid battery, a nickel metal hydride battery, or the like. In other aspects, the first power source 181 can comprise a conventional DC power source, including but not limited to, a battery, a supercapacitor, a photovoltaic panel, DC power supply, any other known source of DC electrical power, or a combination thereof. It is contemplated that the first power source 181 need not be limited to a DC power source. For example, in non-limiting aspects, first power source 181 can include a DC-AC type inverter or other AC power source such as an AC generator.

The first electrical control device 128 can comprise a switching device such as a semiconductor switching device (e.g. a MOSFET), relay, contactor, or the like. In other non-limiting aspects, the first electrical control device 128 can include without limitation, one or more switches, relays, contactors, circuit breakers, inverters, converters, variable frequency drives (VFD), rectifiers, or other devices operable to control a flow of electrical current, etc., and combinations thereof.

In non-limiting aspects, the first electrical control device 128 can be communicatively coupled to the processor 125.

Additionally, the first electrical control device 128 can be electrically coupled to the first power source 181 via the set of electrical power lines 165. The first electrical control device 128 can be further electrically coupled to the first heater member 121 and the second heater member 122 via the set of electrical power lines 165 and the first connector 167 and the second connector 169. For example, the first electrical control device 128 can be coupled electrically in series with the second connector 169, and the first connector 167, via the set of electrical power lines 165. The first electrical control device 128 can be configured to selectively provide electrical power from the first power source 181 to the first heater member 121 and the second heater member 122 via the set of electrical power lines 165.

In non-limiting aspects, the first heater member 121 and the second heater member 122 can be coupled electrically in parallel with each other. The first heater member 121 can be configured to have a first resistance R1, while the second heater member 122 can be configured to have a second electrical resistance R2. In various aspects, the second resistance R2 is greater than the first resistance R1. For example, in non-limiting aspects, the first and second heater members 121, 122 can be formed of the same material, (e.g., copper) with the first heater member 121 configured to have a first overall length L1, while the second heater member 122 can be configured to have a second overall length L2 greater than the first length L1.

In other non-limiting aspects, for example, the first heater member 121 can be formed of a first material having a first resistivity, and the second heater member 122 can be formed of a second material having a second resistivity greater than the first resistivity, with the first length L1 and second length L2 configured such that the second resistance R2 is greater than the first resistance R1.

In non-limiting aspects, the set of sensors 160 can be disposed on or within the housing 110, on the lens cover 130, 230 on the vehicle 10 (FIG. 1) or in any other desired location without departing from the scope of the disclosure herein. The set of sensors 160 can be communicatively coupled to the controller module 124.

The set of sensors 160 can be configured to detect, measure, or otherwise sense a respective parameter. Each sensor 160 can be arranged to provide a respective sensor signal to the controller module 124 indicative of a sensed or measured value of the respective parameter. For example, the value of the respective parameter can be, directly or indirectly, at least partially indicative of one or more of, without limitation, an a temperature of the lens cover 130, 230 an ambient temperature, a magnitude of the first current I1, a magnitude of the second current I2, a voltage of the power source 150, a moisture content on the outward facing surface 132a of the lens cover 130, 230 and the like. The respective sensors 160 can comprise any desired conventional sensor type including, but not limited to, a voltage sensor, a current sensor, a temperature sensor, moisture sensor, a speed sensor, a switch sensor, or combinations thereof.

For example, in non-limiting aspects, the set of sensors 160 can include a first sensor 161 and a second sensor 162. In non-limiting aspects, the first sensor 161 and the second sensor 162 can be configured to detect, measure, or otherwise sense the same respective parameter as the other of the first sensor 161 and the second sensor 162. In other non-limiting aspects, the first sensor 161 or the second sensor 162 can be configured to detect, measure, or otherwise sense a different respective parameter as the other of the first sensor 161 or the second sensor 162. The first sensor 161 can be arranged to provide a respective first sensor signal 161*a* to the controller module 124 indicative of a first sensed or measured value of a respective parameter. The second sensor 162 can be arranged to provide a respective second sensor signal 162*a* to the controller module 124 indicative of a second sensed or measured value of a respective parameter.

In some aspects, the user interface 170 can be disposed on the housing 110 (FIG. 3). In other non-limiting aspects, the user interface 170 can be disposed at any desired location, or combination of locations, on or remote from the heated illumination assembly 100, including, without limitation, a remote or mobile device (not shown), and communicatively coupled to the controller module 124. The user interface 170 can include a second switching device 172, for example, a toggle switch, a slide or a knob, a pushbutton, a key, or combinations thereof to enable a user to trigger an operation of the lens heating system 120. In non-limiting aspects, the user interface can additionally or alternatively comprise, without limitation an electronic interface or display 171. The display 171 can include any suitable communication technology including that of a liquid crystal display (LCD), a light-emitting diode (LED) array, or any suitable display that can convey information to the user, for example regarding a status of the lens heating system 120.

The controller module 124 can be a system of controller modules or a single controller module 124. The controller module 124 can be a controller module dedicated to the control of an operation of the lens heating system 120 and associated components. The processor 125 can be configured to perform a variety of computer-implemented functions and/or instructions (e.g., performing methods, steps, calculations, comparisons, determinations, and the like and storing relevant data as disclosed herein). The instructions, when executed by the processor 125, can cause the processor 125 to perform operations, as described herein. The controller module 124 can include a number of electronic components commonly associated with electronic units utilized in the control of electrical and/or electromechanical systems. For example, the controller module 124 can include the processor 125, the memory 127, and an analog interface circuit (not shown).

The processor 125 can be any type of device capable of executing software or firmware, such as a microcontroller, microprocessor, digital signal processor, or the like. For example, it is contemplated that the processor 125 can be a microprocessor-based controller that implements control software and sends/receives one or more electrical signals to/from each of the various working components to effect control software.

The memory 127 can be embodied as one or more non-transitory, machine-readable media. The memory 127 can be configured to store, amongst other things, instructions in the form of, for example, a software routine (or routines) which, when executed by the processor 125, allows the controller module 124 to control operation of the lens heating system 120.

The memory 127 can be used for storing control software that is executed by the processor 125 in performing an operation of the lens heating system 120 and any additional desired software. For example, the memory 127 can store a set of executable instructions which can include a user-selectable operation. The memory 127 can also be used to store information, such as a database or table, and to store data received from one or more components of the lens heating system 120 (e.g., the set of sensors 160, or the user interface 170) that can be communicably coupled with the controller module 124. The database or table can be used to store the various operating parameters for the operation of the lens heating system 120, including factory or default values for the operating parameters and any adjustments to them by the controller module 124 or by the user interface 170.

For example, in non-limiting aspects, the memory 127 can store, among other things a set of threshold values, such as a set of temperature thresholds 127*a* and/or a set of current thresholds 127*b*. In various aspects the predetermined threshold values can be predetermined (e.g., factory installed) or can be provided by a user (e.g., via the user interface 170).

The controller module 124 can be communicatively coupled to the user interface 170. For example, the user interface 170 can receive data from the controller module 124, via a display signal 171*a* indicative of information to be displayed on the display 171. Other communications paths and methods, with or without the user interface 170, can also be included to allow the controller module 124 to communicate with the user in a variety of ways. For example, the controller module 124 can be configured to send a text message to the user, send an electronic mail to the user, or provide audio information to the user either through the display 171 or utilizing another device such as a mobile phone.

Additionally, the controller module 124 can be communicatively coupled to the user interface 170 to receive a first input signal 170*a* therefrom. The first input signal 170*a* can be indicative of a user input or user provided data. For example, the first input signal 170*a* can be indicative of a status of a user operated switch (e.g., a toggle switch, such as an ON/OFF switch.).

The controller module 124 can be communicatively coupled to the set of sensors 160 to receive a respective sensor signal 161*a*, 162*a* therefrom. The respective sensor signal 161*a*, 162*a* can be indicative of a value of the respective parameter that is sensed, measured, or detected by one or more sensors 160. In non-limiting aspects, the controller module 124 can be configured to determine the value of at least one respective parameter based on the respective sensor signal 161*a*, 162*a*. In some aspects, the controller module 124 can be configured to perform a comparison, or determine a difference between two determined values of at least one respective parameter. Additionally, in some aspects, the controller module 124 can be configured to determine a rate of change over time of the determined value of at least one respective parameter. Further, in some aspects, the controller module 124 can be configured to perform a comparison of the determined value of at least one respective parameter to a threshold value stored in the memory 127.

In non-limiting aspects, the controller module 124 is communicatively coupled to the first electrical control device 128 to control an operation thereof. The control of the first electrical control device 128 can be based at least in part on the determined values of the respective parameters, a rate of change of the value of the respective parameter, a comparison of the value of the respective parameter to the threshold value, the first input signal 170*a*, or combinations thereof.

In operation, the first heater member 121 and the second heater member 122 can selectively heat the lens cover 130, 230. The lens cover 130, 230 can be installed onto the base 111 such that the first connector 167 is electrically coupled to the second connector 169 via the set of electrical power lines 165. The control module 124 can then control an operation of the first electrical control device 128 to selectively provide the first current I1 to the first heater member 121, and the second current I2 to the second heater member 122. For example, the control module 124 can control the operation of the first electrical control device 128 based on the first input signal 170a from the user interface 170. Additionally, or alternatively, the controller module 124 can control the operation of the first electrical control device 128 based on the respective sensor signal 161a, 162a indicative of a value of at least one respective parameter from one or more sensors 160. The controller module 124 can determine the value of at least one respective parameter based on the respective sensor signal 160a. The controller module 124 can then perform a comparison of the determined value of the at least one respective parameter to a threshold value (e.g., a temperature threshold value 127a) stored in the memory 127. In the event the determined value of the at least one respective parameter satisfies the threshold value, the controller module 124 can control the operation of the first electrical control device 128 to provide the first current I1 to the first heater member 121, and the second current I2 to the second heater member 122. It will be appreciated that the first current I1 and the second current I2 will generate an amount heat in the first heater member 121 and second heater member 122, respectively, based on ohmic or Joule heating effects. The amount of heat generated by the first current I1 flowing through the first heater member 121 and the second current I2 flowing through the second heater member 122 will be directly proportional to the magnitude of the first current I1 and second current I2, respectively. Since the first resistance R1 of the first heater member 121 is less than the second resistance of the second heater member 122, the magnitude of the first current I1 will be greater than the magnitude of the second current I2. Consequently, the first heater 121 member will exhibit greater ohmic or Joule heating than the second heater member 122. In this way, the first heater member 121 provides more heat to the first region 105 than the second heater member 122 provides to the second region 106.

In other aspects, the controller module 124 can determine a difference between respective values of two parameters (e.g., an ambient temperature and a temperature of the lens cover 130, 230) based on of the respective sensor signals 161a, 162a. In such aspects, the controller module 124 can further compare the difference between the respective values of the two parameters to a threshold value (e.g., a differential temperature threshold value 127a) stored in the memory 127. In the event the difference between the respective values of the two parameters satisfies the threshold value, the controller module 124 can control the operation of the first electrical control device 128 to provide the first current I1 to the first heater member 121, and the second current I2 to the second heater member 122.

Additionally, or alternatively, in some aspects, the controller module 124 can be configured to determine a rate of change over time of the determined value of at least one respective parameter. In such aspects, the controller module 124 can further compare a rate of change over time of the determined value of at least one respective parameter to a threshold value (e.g., a rate of change of temperature threshold value 127a) stored in the memory 127. In the event the rate of change over time of the determined value of the at least one respective parameter satisfies the threshold value, the controller module 124 can control the operation of the first electrical control device 128 to provide the first current I1 to the first heater member 121, and the second current I2 to the second heater member 122.

Although the example lens heating system 120 depicted in FIG. 6 illustrates a single first power source 181 and a single first electrical control device 128, other aspects are not so limited. Other non-limiting aspects can include a second power source or a second electrical control device, or both, without departing from the disclosure herein.

Figure 7:
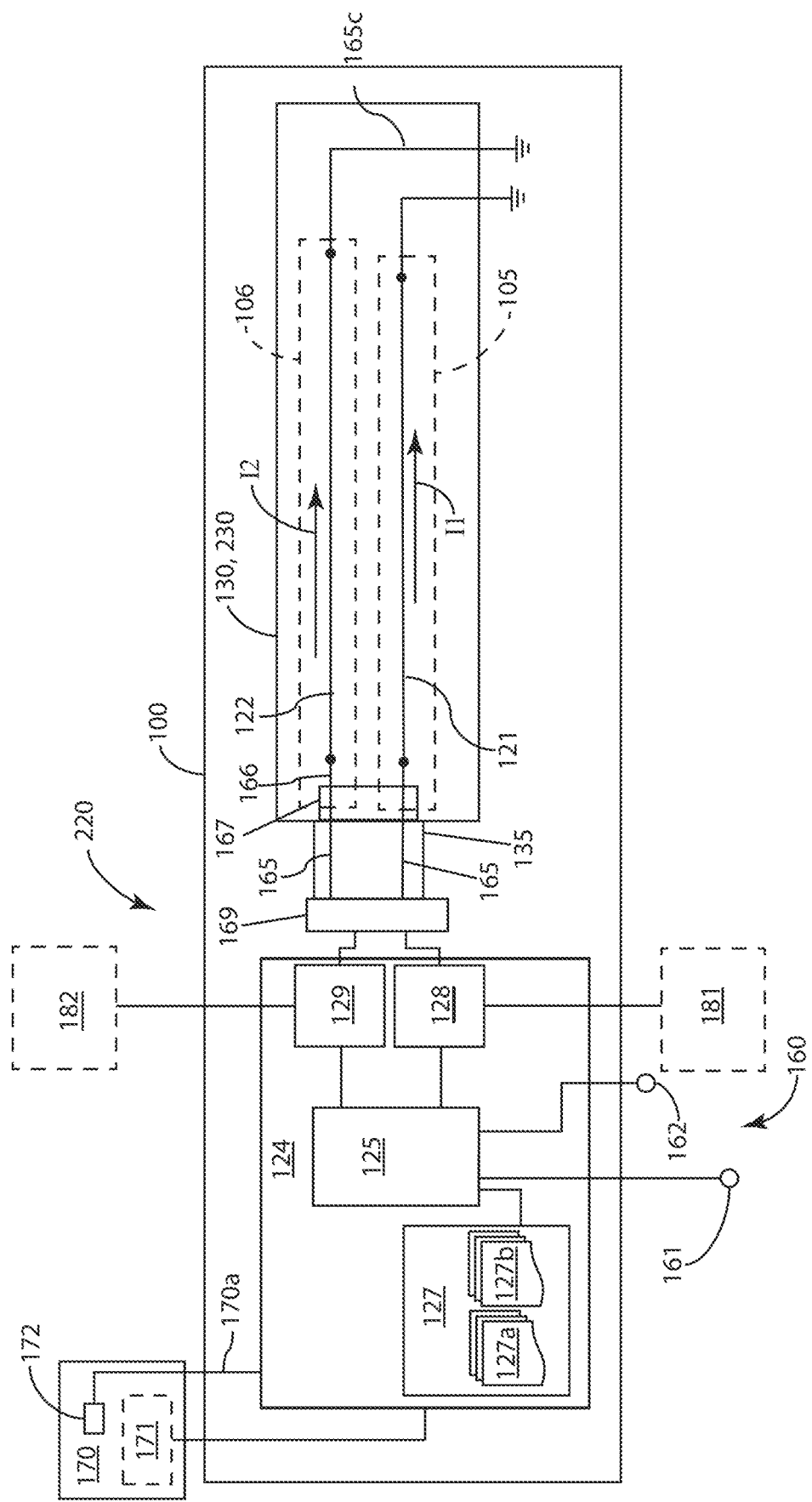
FIG. 7 is a schematic block diagram of another heating system for use with the heated illumination assembly of FIG. 1, according to an aspect of the disclosure.

FIG. 7 depicts another non-limiting aspect of the lens heating system 220. The lens heating system 220 of FIG. 7 is similar to the lens heating system 120 of FIG. 6, so like parts are labelled with like reference numbers. Some notable differences between the lens heating system of FIG. 7 and the lens heating system 120 of FIG. 6 is that the lens heating system 220 of FIG. 7 includes a second power source 182 and a second electrical control device 129.

The lens heating system 220 can further include the controller module 124, the lens cover 130, 230 having and the first and the second heater members 121, 122 coupled to the first connector 167 via the electrically conductive traces 166. The lens heating system 220 can also include the first electrical control device 128, the second connector 169, the set of electrical power lines 165, and the set of sensors 160. In some non-limiting aspects, the lens heating system 220 can further include the user interface 170. The controller module 124 can include the processor 125, and the memory 127 communicatively coupled to the processor 125. The processor 125 can be further communicatively coupled to the first electrical control device 128, the second electrical control device 129, the set of sensors 160, the user interface 170, and combinations thereof. The user interface 170 can include the second switching device 172, to enable a user to trigger an operation of the lens heating system 220. In non-limiting aspects, the user interface can additionally or alternatively include the electronic interface or display 171.

As illustrated, the first power source 181 can be selectively electrically coupled via the first electrical control device 128 to the first heater member 121 to provide electrical power thereto via the set of electrical power lines 165. In non-limiting aspects, the set of electrical power lines 165 can include one or more ground lines 165c. The second power source 182 can be selectively electrically coupled via the second electrical control device 129 to the second heater member 122 to provide electrical power thereto via the set of electrical power lines 165. The processor 125 can be further communicatively coupled to the first electrical control device 128, the second electrical control device 129, the set of sensors 160, the user interface 170, or combinations thereof.

Although not shown for clarity, it will be appreciated that in non-limiting aspects, the first power source 181 or the second power source 182, or both, can be further electrically coupled to the controller module 124 to provide electrical power thereto.

In an aspect, the second power source 182 can include a second battery of the vehicle 10 (FIG. 1) for example, a lithium-ion rechargeable battery, a lead-acid battery, a nickel metal hydride battery, or the like. In other aspects, the first power source 181 can comprise a conventional DC power source, including but not limited to, a battery, a supercapacitor, a photovoltaic panel, DC power supply, any other known source of DC electrical power, or a combination thereof. It is contemplated that the second power source 182 need not be limited to a DC power source. For example, in non-limiting aspects, second power source 182 can include a DC-AC type inverter or other AC power source such as an AC generator.

The second electrical control device 129 can comprise a switching device such as a semiconductor switching device (e.g. a MOSFET). In other non-limiting aspects, the second electrical control device 129 can include without limitation, one or more switches, relays, contactors, circuit breakers, inverters, converters, variable frequency drives (VFD), rectifiers, or other devices operable to control a flow of electrical current, etc., and combinations thereof.

In non-limiting aspects, the second electrical control device 129 can be communicatively coupled to the processor 125. Additionally, the second electrical control device 129 can be electrically coupled to the second power source 182 via the set of electrical power lines 165. It is contemplated that in other aspect, having only a first power source 181, the second electrical control device 129 can instead be coupled to the first power source 181 via the set of electrical power lines 165, without departing from the scope of the disclosure. The second electrical control device 129 can be further electrically coupled to second heater member 122 via the set of electrical power lines 165 and the first connector 167 and the second connector 169. Likewise, the first electrical control device 128 can be coupled to the first power source 181 via the set of electrical power lines 165, and further electrically coupled to first heater member 121 via the set of electrical power lines 165 and the first connector 167 and the second connector 169. The first electrical control device 128 can be configured to selectively or switchably provide electrical power from first power source 181 to the first heater member 121, and the second electrical control device 129 can be configured to selectively or switchably provide electrical power from the second power source 182 to the second heater member 122, via the set of electrical power lines 165.

In non-limiting aspects, the controller module 124 is communicatively coupled to the first electrical control device 128 and the second electrical control device 129 to control a respective operation thereof. The control of the first electrical control device 128 and the second electrical control device 129 can be based at least in part on the determined values of the respective parameters, a rate of change of the value of the respective parameter, a comparison of the value of the respective parameter to the threshold value, the first input signal 170a, or combinations thereof.

In operation, the first heater member 121 and the second heater member 122 can heat the lens cover 130, 230. The lens cover 130, 230 can be installed onto the base 111 such that the first connector 167 is electrically coupled to the second connector 169 via the set of power lines 165. The control module 124 can then control an operation of the first electrical control device 128 and the second electrical control device 129 to selectively provide the first current I1 to the first heater member 121, and the second current I2 to the second heater member 122. For example, the control module 124 can control the operation of the first electrical control device 128 based on the first input signal 170a from the user interface 170. Additionally, or alternatively, the controller module 124 can control the operation of the first electrical control device 128 and the second electrical control device 129 based on the respective sensor signals 161a, 162a indicative of a value of at least one respective parameter from one or more sensors 160. The controller module 124 can determine the value of at least one respective parameter based on the respective sensor signals 161a, 162a. The controller module 124 can then perform a comparison of the determined value of the at least one respective parameter to a threshold value (e.g., a temperature threshold value 127a) stored in the memory 127. In the event the determined value of the at least one respective parameter satisfies the threshold value, the controller module 124 can selectively control the operation of the first electrical control device 128 to provide the first current I1 to the first heater member 121, and/or control the operation of the second electrical control device 129 to provide second current I2 to the second heater member 122.

In other aspects, the controller module 124 can determine a difference between respective values of two parameters (e.g., an ambient temperature and a temperature of the lens cover 130, 230) based on the set of respective sensor signals 161a, 162a. In such aspects, the controller module 124 can further compare the difference between the respective values of the two parameters to a threshold value (e.g., a differential temperature threshold value 127a) stored in the memory 127. In the event the difference between the respective values of the two parameters satisfies the threshold value, the controller module 124 can control the operation of the first electrical control device 128 to provide the first current I1 to the first heater member 121, and/or control the operation of the second electrical control device 129 to provide the second current I2 to the second heater member 122.

Additionally, or alternatively, in some aspects, the controller module 124 can further compare a rate of change over time of the determined value of at least one respective parameter to a threshold value (e.g., a rate of change of temperature threshold value 127a) stored in the memory 127. In the event the rate of change over time of the determined value of the at least one respective parameter satisfies the threshold value, the controller module 124 can control the operation of the first electrical control device 128 to provide the first current I1 to the first heater member 121, and/or control the operation of the second electrical control device 129 to provide the second current I2 to the second heater member 122.

The aspects described herein set forth a heated illumination assembly that is configured or adapted for mounting to a snowplowing assembly and selective moisture reduction on a surface of the lens cover for an improved user experience, including improved driver viewability and more efficient allocation of electrical power, a user interface, and onboard processing for configuration settings, such as a microprocessor or memory system internal to the heated illumination assembly that allows operation of auxiliary safety features during snowplowing modes of operation.

Aspects as described herein enable selective measures to prevent buildup of snow or ice on the heated illumination assembly in colder climates, so as to not block or impede either the illumination or sensing functions associated with the heated illumination assembly, or the inclusion of additional safety features, while ensuring that such features, such as heating features reduce radio frequency (RF) interference (RFI) or electromagnetic interference (EMI) for necessary safety sensors or systems of the heated illumination assembly.

It will also be understood that various changes or modifications can be made without departing from the spirit of the present disclosure. By way of non-limiting example, although the present disclosure is described for use with a vehicle with a snowplowing assembly installed, it will be recognized that the principles for providing such heated illumination assemblies can be used with other types of vehicles having other types of installed accessories or packages.

To the extent not already described, the different features and structures of the various aspects can be used in combination with each other as desired. That one feature is not illustrated in all of the aspects is not meant to be construed that it cannot be, but is done for brevity of description. Thus, the various features of the different aspects can be mixed and matched as desired to form new aspects, whether or not the new aspects are expressly described. Combinations or permutations of features described herein are covered by this disclosure.

This written description uses examples to disclose aspects of the disclosure, including the best mode, and also to enable any person skilled in the art to practice aspects of the disclosure, including making and using any devices or systems and performing any incorporated methods. While aspects of the disclosure have been specifically described in connection with certain specific details thereof, it is to be understood that this is by way of illustration and not of limitation. Reasonable variation and modification are possible within the scope of the forgoing disclosure and drawings without departing from the spirit of the disclosure, which is defined in the appended claims.

What is claimed is:

1. A heated illumination assembly, comprising:
a lens cover defining a first region and a second region;
a first heater member having a first electrical resistance, disposed in the first region to heat the first region;
a second heater member having a second electrical resistance different from the first electrical resistance disposed in the second region to heat the second region;
the first heater member and the second heater member configured to be selectively electrically coupled to at least one power source to receive at least one of a first current and a second current, respectively therefrom;
a controller module arranged to receive at least one input signal, and configured to selectively electrically couple at least one of the first heater member and the second heater member to the at least one power source, based on the at least one input signal;
a first electrical control device communicatively coupled to the controller module, the first electrical control device electrically coupled to the at least one power source to receive electrical power therefrom, and selectively electrically coupleable to the first heater member to provide the first current thereto;
a second electrical control device communicatively coupled to the controller module, the second electrical control device electrically coupled to the at least one power source to receive electrical power therefrom, and selectively electrically coupleable to the second heater member to provide the second current thereto; and
wherein the controller module is further configured to control a respective operation of the first electrical control device and the second electrical control device.

2. The heated illumination assembly of claim 1, wherein the second heater member is coupled electrically in parallel with the first heater member.

3. The heated illumination assembly of claim 1, wherein the first heater member extends for a first overall length, and the second heater member extends for a second overall length, wherein the first overall length and second overall length are non-equal.

4. The heated illumination assembly of claim 1, wherein the first heater member and second heater member have different shapes with respect to each other.

5. The heated illumination assembly of claim 1, wherein the first heater member and the second heater member are arranged on the lens cover in a nested relationship.

6. The heated illumination assembly of claim 1, wherein the at least one power source is a power source of a vehicle.

7. The heated illumination assembly of claim 1, wherein controller module is communicatively coupled to a user interface, wherein the controller module is further configured to receive the at least one input signal from the user interface.

8. The heated illumination assembly of claim 1, further comprising at least one sensor communicatively coupled to the controller module and configured to sense a first parameter, and to provide the at least one input signal to the controller module, wherein the at least one input signal is indicative of a value of the first parameter.

9. The heated illumination assembly of claim 8, wherein the controller module is configured to determine the value of the first parameter, and to compare the value of the first parameter to a threshold value, the controller module further configured to selectively electrically couple at least one of the first heater member and the second heater member to the at least one power source to provide the at least one of the first current or the second current, respectively thereto, when the threshold value is satisfied.

10. The heated illumination assembly of claim 8, wherein the at least one sensor comprises at least two sensors, each of the at least two sensors configured to sense a respective first parameter, and to respectively provide the at least one input signal to the controller module, wherein the at least one input signal is indicative of a value of the respective first parameter, wherein the controller module is configured to:
determine the value of each respective first parameter;
determine a difference between the value of each respective first parameter;
compare the difference between the value of each respective first parameter to a threshold value, and, when the threshold value is satisfied,
selectively electrically couple at least one of the first heater member and the second heater member to the at least one power source to provide the at least one of the first current or the second current, respectively thereto.

11. The heated illumination assembly of claim 8, wherein the first parameter is a temperature.

12. The heated illumination assembly of claim 8, wherein the first parameter comprises one of a current or a voltage.

13. The heated illumination assembly of claim 8, wherein the first parameter is a rate of change of one of a temperature or an electrical current.

14. The heated illumination assembly of claim 8, further comprising a second sensor communicatively coupled to the controller module and configured to sense a second parameter, and to provide a second input signal to the controller module, wherein the second input signal is indicative of a value of the second parameter.

15. The heated illumination assembly of claim 14, wherein the controller module is configured to determine the value of the second parameter, and to compare the value of the second parameter to the value of the first parameter, the controller module further configured to selectively electrically couple at least one of the first heater member and the second heater member to the at least one power source to provide the at least one of the first current or the second current, respectively thereto, based on the comparison of the value of the second parameter to the value of the first parameter.

16. The heated illumination assembly of claim 1, wherein the at least one power source includes a first power source and second power source, wherein the first heater member is configured to be selectively electrically coupled to the first power source to receive the first current therefrom, and the second heater member is configured to be selectively electrically coupled to the second power source to receive the second current therefrom.

17. The heated illumination assembly of claim 1, further comprising at least one connector, wherein at least one of the first heater member and second heater member are electrically coupled to the at least one power source via the at least one connector.

18. The heated illumination assembly of claim 17, wherein the lens cover includes a connector guide member configured to support a set of electrical power conductors electrically coupled with the first heater member and the second heater member.

19. The heated illumination assembly of claim 18, wherein the connector guide member includes a first surface configured to guide an insertable electrical coupling of at least a subset of electrical power conductors to the at least one connector device.

20. A heated illumination assembly, comprising:
- a lens cover having a connector guide member and defining a first region and a second region;
- a first heater member having a first electrical resistance, disposed in the first region to heat the first region;
- a second heater member having a second electrical resistance different from the first electrical resistance disposed in the second region to heat the second region;
- the first heater member and the second heater member configured to be selectively electrically coupled to at least one power source to receive at least one of a first current and a second current, respectively therefrom;
- a controller module arranged to receive at least one input signal, and configured to selectively electrically couple at least one of the first heater member and the second heater member to the at least one power source, based on the at least one input signal; and
- at least one connector, wherein at least one of the first heater member and second heater member are electrically coupled to the at least one power source via the at least one connector;
- wherein the connector guide member includes a first surface configured to guide at least a subset of electrical power conductors electrically coupled with the first heater member and the second heater member to the at least one connector.

\* \* \* \* \*